Patented Jan. 8, 1935

1,986,908

UNITED STATES PATENT OFFICE 1,986,908

PRODUCTION OF NEW COMPOSITIONS OF MATTER BY THE ESTERIFICATION OF CELLULOSIC MATERIAL

Victor Emmanuel Yarsley, Ewell, England, assignor of one-half to The Cellulose Acetate Silk Company, Limited, Lancaster, England No Drawing. Application October 28, 1933, Serial No. 695,725. In Great Britain November 3, 1932

9 Claims. (Cl. 260—101)

This invention relates to the production of new compositions of matter by the esterification of cellulosic material.

The term "cellulosic material" in the present specification and claims means the raw materials used in the manufacture of cellulose esters and ethers which can be classified in one of the following three groups, namely: (a) cotton linters, (b) lower grade cellulose pulps, such as wood pulp, bamboo cellulose, and the like, or (c) paper. The term "cellulosic material" in the present specification and claims, therefore, does not include spun cotton in hank form. I am aware that it has been proposed superficially to acetylate spun cotton in hank form for the purpose of "immunizing" the outer threads. In this known process an endeavour is made superficially to acetylate all the material treated to the same degree.

The invention consists in subjecting cellulosic material to an acetylating treatment so controlled that the resultant product is a homogeneous mass comprising a mixture of completely acetylated and partly acetylated cellulose material, the latter retaining in part the original cellulose fibre structure and being uniformly distributed throughout the mass.

The product obtained according to the invention may, if desired, be "ripened" in the usual way, so that the portion of the cellulosic material which has been acetylated shows the required degree of solubility in organic solvent media.

Products of this nature, in which the cellulosic material is in part completely acetylated and in part superficially acetylated, can be used in conjunction with the usual resinous, organic or mineral fillers, gelatinizing agents and the like, in the preparation of plastic compositions and moulding powders which, in the presence of suitable solvents, and/or by the application of heat and pressure, yield compact and rigid masses or translucent or opaque films or sheets. These depend for their cohesive force on the cellulose ester present. The unacetylated cellulosic material present functions as a binder and re-enforcing medium which imparts increased strength and added flexibility to the product. In this respect it is far superior to known mechanical mixtures of cellulose ester and fibrous filler, such as cotton flock, asbestos fibre, and the like, since the gelatinous surface of the residual fibre actually unites or coalesces with the gelatinous ingredients of the plastic composition.

Example 100 lbs. of bleached cotton linters, wood pulp, or paper are gradually added with constant stirring to a mixture of 300 lbs. acetic anhydride (91-95%), 400 lbs. glacial acetic acid and 5-10% concentrated sulphuric acid which has previously been cooled to 0° C. The temperature, which is maintained as low as possible by the application of brine cooling for several hours, will show gradual rise. When it has reached a maximum, which should not exceed 35° C., a further addition of 40 lbs. of cotton linters, wood-pulp, or paper is made and the reaction allowed to proceed with constant stirring and the application of cooling for about 3 hours, or until the added cellulosic material has been superficially acetylated. 20 lbs. of water is then gradually added with constant mixing, care being again taken to keep the temperature of the mass as low as possible. The mixture is then "ripened" in the usual manner by allowing it to stand at 20-25° for 44 hours, or until the completely acetylated portion shows the desired solubility in acetone. The product is precipitated with water, washed until acid-free, stabilized in the well known manner, separated by centrifuge and dried at a moderate temperature.

The example above given may be modified in a number of ways. For example, instead of adding cellulosic material at an intermediate stage of the process, the additional material may be incorporated in the starting mass, being then in a known excess in relation to the amount of acetylating agent present. Alternatively, the cellulosic material may be initially introduced in excess and a subsequent addition may be made at an intermediate stage of the process.

The same result may be obtained by following the normal acetylation procedure but reducing the duration of the reaction and/or the reaction temperature. Some of the cellulose fibres will suffer complete acetylation, others will suffer only superficial change. Here again it is essential that sufficient time is allowed for the complete superficial acetylation of the cellulose fibres.

This modification may be further modified by adding cellulosic material to the reaction mass, sufficient time being allowed for superficial acetylation of such addition.

In a further modification further cellulosic material may be added after acetylation proper is complete, but prior to the hydrolysis of the residual acetylating agent.

In another modification solutions of (a) a completely acetylated cellulose and (b) a partially or superficially acetylated cellulose, are poured together and the resultant mixture is precipitated.

In all the foregoing methods the primary product of the acetylation may be "ripened" to give the required degree of solubility in organic solvents. If so desired the product may be separated unripened at the end of the primary stage, precipitated, washed free from acid and dried.

In all the methods enumerated some or all of the organic solvent diluent may be replaced by an organic nonsolvent diluent.

The acetylation may be facilitated by pre-treatment of the cellulosic material by any known method.

The material prepared according to the invention may be cast into films, or pressed into blocks from which sheets can be cut in the known manner.

The new material, admixed with suitable solvents, plasticizers and fillers in the well known manner, yields thermoplastic moulding compositions which have greater strength than corresponding compositions prepared from the commercial acetone-soluble cellulose acetate.

The product obtained according to the present invention, when incorporated with the solvents, plasticizers, fillers, pigments, and the like, usual in the cellulose industry, may be cast into films, and it is found that films are produced having a velvet matt surface, that is to say the surface has an appearance between that of a highly polished surface obtained when using ordinary cellulose ester, and the matt surface obtained by a special method of casting the ordinary cellulose ester. This special surface is obtained by adapting the ordinary method of casting the film, that is to say by removing the film from the band on which it is cast before it is thoroughly dry. If it is desired for one surface of the film to be of a highly polished nature, it is allowed to remain on the band on which it is cast until it is thoroughly dry.

The material can also be used inter alia in the production of splinterless glass, as the intermediate cementing layer. It is found that in this application of the new material a frosted appearance is given to the laminated structure.

The new material has also a special application as an insulating material for wrapping conducting wires and the like. The advantage of this application resides in the fact that the film is not transparent, with the result that it is easy for the operator to wind the film on to the conductor in such a way as to avoid overlapping or uneven wrapping, because the edges of the film are easily visible to the operator. Furthermore it has been found that the electrical insulating properties of such a film are superior to those of similar film prepared from the commercial acetone-soluble cellulose acetate.

The materials according to the invention are also particularly suitable by reason of their pleasing velvet matt surface for the preparation of compositions suitable for coating fabrics and other materials, for example in the manufacture of leather substitutes.

What I claim and desire to secure by Letters Patent is:—

1. Process for the production of a new composition of matter consisting in subjecting cellulosic material to an acetylation treatment, the cellulosic material being in excess to that theoretically required for complete acetylation so that on the completion of the reaction there remains some cellulosic material which is only partly acetylated, the latter retaining in part the original cellulose fibrous structure and being uniformly distributed throughout the mass.

2. Process as claimed in claim 1 consisting in following the normal acetylation procedure but reducing the duration of some of the reaction and/or the reaction temperature but allowing sufficient time for the complete acetylation of the cellulose fibres, so that in the resulting mass some of the cellulosic material is only partly acetylated, and adding a further quantity of cellulosic material to the reaction mass allowing sufficient time for superficial acetylation of the added material.

3. Process as claimed in claim 1 consisting in adding cellulosic material in excess of requirements at an intermediate stage of the process, and when the cellulosic material initially added has been completely acetylated and passed into solution.

4. Process as claimed in claim 1 further consisting in initially introducing all of the cellulosic material in excess into the acetylating liquid so that a part of the cellulosic material will be only partly acetylated.

5. Process as claimed in claim 1 further consisting in initially introducing cellulosic material into the reaction mass in excess of that required for complete conversion, and subsequently adding a further quantity of cellulosic material at an intermediate stage of the process.

6. Process as claimed in claim 1 wherein further cellulosic material is added after the acetylation proper is complete, but prior to the hydrolysis of the residual acetylating agent.

7. Process as claimed in claim 1 wherein further cellulosic material is added after the acetylation proper is complete, but prior to the hydrolysis of the residual acetylating agent, the acetylation being carried out in the presence of an organic solvent diluent, such as glacial acetic acid.

8. Process as claimed in claim 1 wherein further cellulosic material is added after the acetylation proper is complete, but prior to the hydrolysis of the residual acetylating agent, the acetylation being carried out in the presence of a non-solvent diluent, such as benzene, toluene, carbon tetrachloride and the like.

9. A new composition of matter comprising a mixture of completely acetylated and partly acetylated cellulosic material having uniformly distributed throughout its mass part of the original cellulose fibrous structure of the partly acetylated cellulosic material.

VICTOR EMMANUEL YARSLEY.